(12) United States Patent
Posthumus et al.

(10) Patent No.: US 9,174,872 B2
(45) Date of Patent: Nov. 3, 2015

(54) SULPHUR CEMENT PRODUCTS

(75) Inventors: Willem Posthumus, Eindhoven (NL); Catherine Frances Smura, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 286 days.

(21) Appl. No.: 13/981,110

(22) PCT Filed: Jan. 24, 2012

(86) PCT No.: PCT/EP2012/051058
§ 371 (c)(1),
(2), (4) Date: Sep. 24, 2013

(87) PCT Pub. No.: WO2012/101127
PCT Pub. Date: Aug. 2, 2012

(65) Prior Publication Data
US 2014/0007792 A1  Jan. 9, 2014

(30) Foreign Application Priority Data

Jan. 25, 2011 (EP) ..................................... 11151973

(51) Int. Cl.
C04B 28/36 (2006.01)
C04B 24/42 (2006.01)
C04B 14/06 (2006.01)
C04B 40/00 (2006.01)

(52) U.S. Cl.
CPC ................. C04B 24/42 (2013.01); C04B 14/06 (2013.01); C04B 28/36 (2013.01); C04B 40/0039 (2013.01)

(58) Field of Classification Search
CPC .... C04B 28/36; C04B 20/0076; C04B 24/42; C04B 24/08; C04B 24/34; C04B 40/0085; C04B 40/0039; C04B 14/022; C04B 14/28; C04B 14/06
See application file for complete search history.

(56) References Cited

U.S. PATENT DOCUMENTS

| 4,164,428 A | 8/1979 | Simic |
| 4,376,830 A | 3/1983 | Nimer et al. |
| 9,017,472 B2 * | 4/2015 | de Boer et al. ............. 106/287.1 |
| 2014/0007792 A1 * | 1/2014 | Posthumus et al. ........... 106/272 |

FOREIGN PATENT DOCUMENTS

| GB | 2015568 | 9/1979 |
| GB | 0048106 | 3/1982 |
| WO | 2007065920 | 6/2007 |
| WO | 2008148804 | 12/2008 |
| WO | 2008148814 | 12/2008 |
| WO | 2008152054 | 12/2008 |
| WO | WO2009150193 | 12/2009 |
| WO | 2010012601 | 2/2010 |
| WO | 2010086391 | 8/2010 |
| WO | 20100133580 | 11/2010 |
| WO | 2011000837 | 1/2011 |

* cited by examiner

*Primary Examiner* — David M Brunsman
(74) *Attorney, Agent, or Firm* — Charles W. Stewart

(57) ABSTRACT

A sulphur cement product comprising sulphur, filler, sand having a surface area of greater than 0.5 m²/g, and an organosilane having at least one amino functional group is disclosed. Further, a process for the preparation of such cement sulphur product is disclosed.

6 Claims, 1 Drawing Sheet

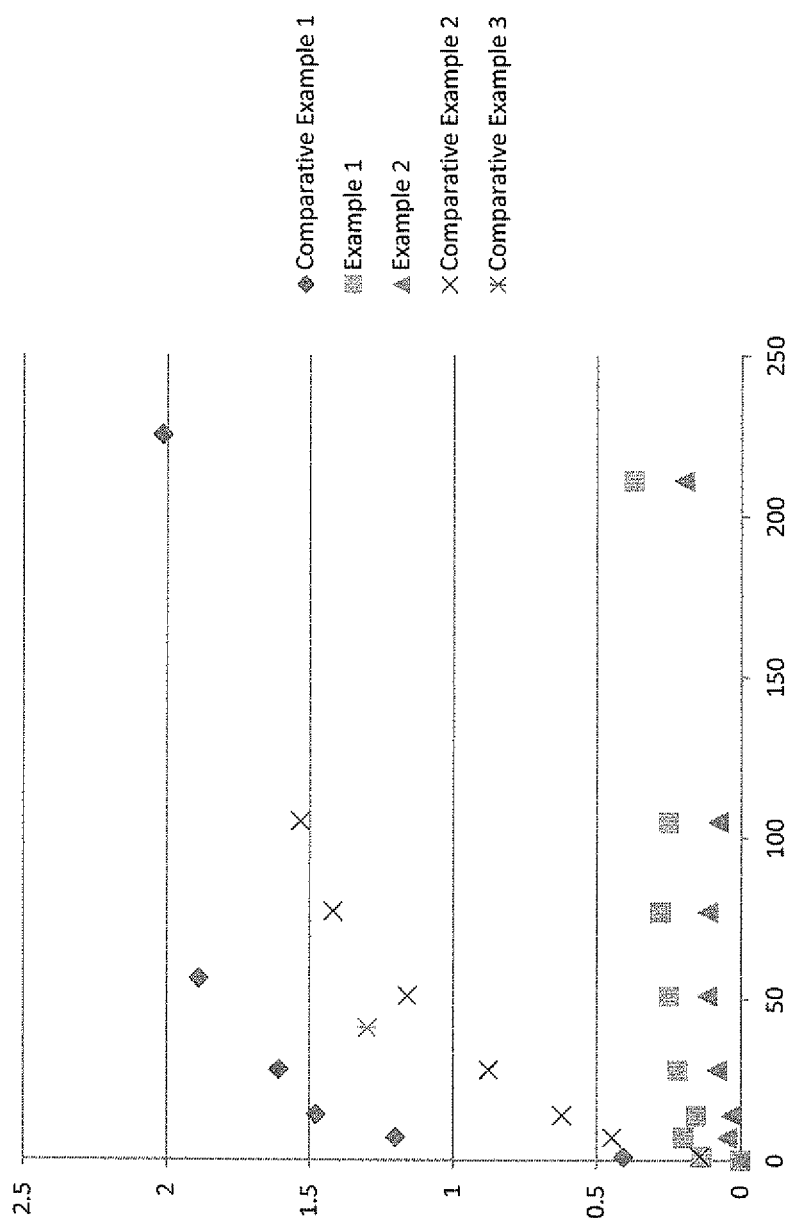

SULPHUR CEMENT PRODUCTS

PRIORITY CLAIM

The present application claims priority from PCT/EP2012/051058, filed 24 Jan. 2012, which claims priority from European patent 11151973.2, filed 25 Jan. 2011, which is incorporated herein by reference.

FIELD OF THE INVENTION

The present invention provides sulphur cement products including sulphur mortar and sulphur concrete. The invention also provides a process for the preparation of sulphur cement products.

BACKGROUND OF THE INVENTION

Elemental sulphur or modified sulphur can be used to bind aggregate and filler, thereby providing sulphur cement products such as sulphur mortar and sulphur concrete. Sulphur concrete can be used in a variety of pre-cast concrete applications such as marine defences, paving slabs, road barriers and retaining walls.

Sand is very commonly used as a fine aggregate in sulphur mortar and sulphur concrete. It is desirable to use sand that is available locally for reasons of cost and convenience.

U.S. Pat. No. 4,376,830 discusses the problem of using aggregates that are contaminated with water-expandable clays. These clays can cause the sulphur mortar or concrete to disintegrate when exposed to water. It is possible to remove the clays by washing procedures, but this is uneconomical. The '830 patent teaches that organosilanes having functional groups such as amino, epoxy and mercapto groups can be incorporated into sulphur mortar or concrete to reduce the water expandability of the water-expandable clay.

The present inventors have found that sulphur mortar and sulphur concrete prepared from porous sand having a high surface area is also liable to disintegrate when exposed to water. This is not due to the presence of expandable clays (washing procedures do not affect the water stability of sulphur mortar and sulphur concrete prepared from the sand). The inventors have sought to improve the water stability of sulphur mortar and sulphur concrete prepared from this high-surface-area sand.

SUMMARY OF THE INVENTION

The present inventors have surprisingly found that organosilanes having amino functional groups can improve the water stability of sulphur mortar and sulphur concrete prepared from sand having a high surface area. Organosilanes having mercapto and sulphide functional groups do not have the same effect when used within the same concentration range.

Accordingly, the present invention provides a sulphur cement product comprising sulphur, filler, sand having a surface area of greater than 0.5 $m^2/g$, and an organosilane having at least one amino functional group.

In a further aspect, the invention provides a process for the preparation of a sulphur cement product comprising the steps of:
(a) admixing sulphur, filler, sand having a surface area of greater than 0.5 $m^2/g$, and an organosilane having at least one amino functional group; and
(b) solidifying the molten sulphur cement product.

DETAILED DESCRIPTION OF THE INVENTION

The term "sulphur cement product" refers to a composite comprising sulphur, filler and aggregate. Fillers and aggregate are particulate inorganic materials. Fillers have an average particle size in the range of from 0.1 µm to 0.1 mm. Fine aggregate has an average particle size in the range of from 0.1 to 5 mm. Sand is one type of fine aggregate. Coarse aggregate has an average particle size in the range of from 5 to 40 mm. Sulphur mortar comprises sulphur, filler, sand and optionally additional fine aggregate, but does not comprise coarse aggregate. Sulphur concrete comprises sulphur, filler, coarse aggregate, sand and optionally additional fine aggregate.

According to one preferred embodiment, the sulphur cement product of the invention is a sulphur mortar. According to another preferred embodiment, the sulphur cement product of the invention is a sulphur concrete.

The amounts of sulphur, filler, sand and additional aggregate in the sulphur cement products of the invention can be chosen by the skilled person in view of the proposed application of the sulphur cement product. The skilled person will seek to ensure that sufficient sulphur is incorporated to bind the filler and aggregate, that sufficient filler and aggregate are incorporated to provide mechanical strength and that the balance of components provides a mixture with suitable workability for the proposed application. Sulphur mortar preferably comprises from 5 to 40 wt % sulphur, from 45 to 90 wt % fine aggregate and from 1 to 10 wt % filler; more preferably from 5 to 30 wt % sulphur, from 55 to 75 wt % fine aggregate and from 3 to 8 wt % filler, where weight percentages are based upon the weight of the sulphur mortar. Sulphur concrete preferably comprises from 5 to 40 wt % sulphur, from 25 to 50 wt % coarse aggregate, from 20 to 40 wt % fine aggregate and from 1 to 10 wt % filler; more preferably from 5 to 30 wt % sulphur, from 30 to 40 wt % coarse aggregate, from 25 to 35 wt % fine aggregate and from 3 to 8 wt % filler, where weight percentages are based upon the weight of the sulphur concrete.

The sand in the sulphur cement products of the invention has a surface area of greater than 0.5 $m^2/g$, preferably greater than 1 $m^2/g$, more preferably greater than 1.5 $m^2/g$ and most preferably greater than 2 $m^2/g$. The surface area of the sand is measured according to the BET technique using nitrogen, following the procedure as set forth in Example 1.

The surface area of quartz is usually about 0.25 $m^2/g$ and the surface area of normsand (used in European standards as a typical sand used in concrete) is about 0.02 $m^2/g$. Sand may have a high surface area due to a surface layer of palygorskite. The presence of a palygorskite surface layer in sand can be detected using energy dispersive x-ray spectroscopy.

In addition to the sand having a surface area of greater than 0.5 $m^2/g$, the sulphur cement product may comprise additional fine aggregate such as sand, typically from a different geological formation, that has a surface area of 0.5 $m^2/g$ or less. However, it is conventional to use only one type of sand, for example sand from one geological formation, in a sulphur cement product. It will be appreciated that the surface area of the sand is being measured by taking representative samples from the sand and measure the average, bulk, surface area of the samples according to the BET technique using nitrogen, following the procedure set forth in Example 1. According to a preferred embodiment, the sand in the sulphur cement product will have a bulk surface area of greater than 0.5 $m^2/g$, preferably greater than 1 $m^2/g$. The (bulk) surface area will typically not be more than 10 m²/g, preferably not be more than 5 m²/g, more preferably not more than 3.5 m²/g.

The sulphur cement product of the invention comprises an organosilane having at least one amino functional group. An organosilane is a compound having at least one carbon-silicon bond or at least one carbon-oxygen-silicon group. The organosilane may be functionalised with one amino group or with several amino groups. Suitable organosilanes include 3-aminopropyl triethoxy silane, bis(triethoxysilylpropyl) amine, 3-bis(3-aminopropyl)-1,1,3,3-tetramethyldisiloxane, Dynasylan™ 1146 and Dynasylan™ 1151. Structures are shown below:

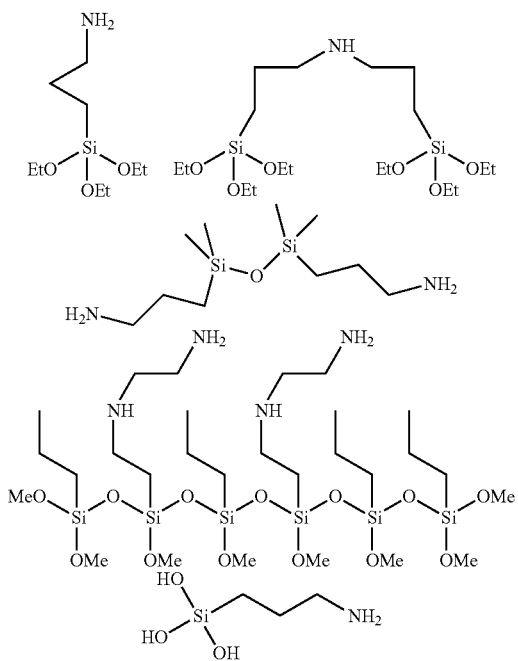

The amino groups may be primary, secondary or tertiary amino groups. Also, the term "an organosilane having at least one amino functional group" encompasses organosilanes having functional groups that are converted to amino functional groups under the processing conditions for preparing sulphur cement products. For example, imine groups will hydrolyse under the processing conditions for preparing sulphur cement products, so an organosilane having an imine group falls within the term "an organosilane having at least one amino functional group". A suitable imine functionalised organosilane is N-{3-(triethoxysilyl)propyl}-4,5-dihydroimidazole:

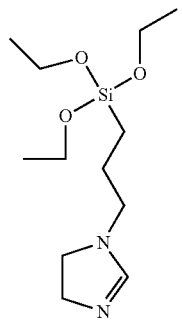 [SMILES: CCO[Si](CCCN1C=NCC1)(OCC)OCC]

The amount of organosilane having at least one amino functional group in the sulphur cement product is preferably from 0.05 to 2 wt % based upon the weight of the sand having a surface area of greater than 1.5 m²/g, more preferably from 0.1 to 1 wt %. The preferred amount of organosilane is a balance between incorporating sufficient organosilane to achieve effective water stability and minimising the cost due to organosilane addition.

In addition to the organosilane having at least one amino functional group, it may be desirable to incorporate additional organosilane compounds in the sulphur cement products of the invention (and also in the sulphur cement pre-composition and wax-based pre-composition of the invention). Alternatively or additionally, organotitanate compounds may be incorporated into the sulphur cement products (and the sulphur cement pre-composition and wax-based pre-composition). Suitable organosilane and organotitanate compounds are disclosed in WO 2008 148814, WO 2008 152054, WO 2009 150193, WO 2010 012601 and WO 2010 086391. A particularly preferred additional organosilane agent is bis(3-triethyoxysilylpropyl)tetrasulphide.

The sulphur cement products of the invention are suitably prepared by a process wherein all the components are admixed at a temperature at which the sulphur is molten, i.e. typically above 120° C., preferably in the range of from 120 to 150° C., more preferably in the range of from 125 to 140° C. The admixture is preferably poured into a mould. The sulphur cement product is then solidified by cooling to a temperature at which the sulphur solidifies. After cooling, the sulphur cement product can be demoulded.

In the process of the invention, a selection of the components may be supplied to the mixing step in the form of a pre-composition or masterbatch. For example, sulphur and the organosilane having at least one amino functional group may be supplied as a sulphur pre-composition. Therefore, in a preferred embodiment of step (a) of the process of the invention a sulphur cement pre-composition comprising sulphur and an organosilane having at least one amino functional group is mixed with filler and sand having a surface area of greater than 0.5 m²/g. The sulphur cement pre-composition preferably comprises less than 1 wt % filler and less than 1 wt % aggregate; and most preferably comprises no filler and no aggregate. The sulphur cement pre-composition preferably comprises from 0.01 to 20 wt % of the organosilane having at least one amino functional group, more preferably from 0.01 to 10 wt %, most preferably from 0.01 to 1 wt %, wherein weight percentages are based upon the weight of the sulphur cement pre-composition. The sulphur cement pre-composition preferably comprises at least 80 wt % sulphur. In one embodiment, the sulphur cement pre-composition may comprise higher quantities of organosilane having at least one amino functional group, e.g. from 5 to 20 wt %, and may also comprise higher quantities of filler, e.g. from 5 to 20 wt %, wherein weight percentages are based upon the weight of the sulphur cement pre-composition. In this embodiment, the sulphur cement pre-composition is a "concentrated" pre-composition and such a "concentrated" pre-composition can be used in small quantities to provide significant amounts of organosilane having at least one amino functional group.

Alternatively, the organosilane having at least one amino functional group may be supplied as a wax-based pre-composition. The wax functions primarily as a carrier material. Therefore, in another preferred embodiment of step (a) of the process of the invention, a wax-based pre-composition comprising wax and an organosilane having at least one amino functional group is mixed with sulphur, filler and sand having a surface area of greater than 0.5 m²/g. The wax-based pre-composition preferably comprises less than 1 wt % aggregate; and most preferably comprises no aggregate. Preferably the wax-based pre-composition additionally comprises a filler or mineral adsorbate, e.g. calcium silicate, carbon black or calcium carbonate. The wax-based pre-composition preferably comprise up to 70 wt % wax, up to 20 wt % mineral adsorbate and greater than 10 wt % organosilane having at least one amino functional group, where weight percentages are based upon the weight of the wax-based pre-composition. In addition to wax, the wax-based pre-composition may also comprise polymer and/or sulphur.

Sulphur cement products produced according to the invention can be used in a variety of applications. Sulphur concrete may be used in pre-cast concrete applications such as marine defences, paving slabs, road barriers and retaining walls.

Examples

The invention is further illustrated by means of the following non-limiting examples.

Five samples were prepared using the following method. Approximately 200 g of sulphur mortar was prepared using 25% (by mass of the total composite) sulphur, 28% quartz filler and 47% of high surface area sand (which was sieved to remove particles with diameter greater than 2.36 mm). The surface area of the sand was measured as 2.25 m$^2$/g for a washed sample and 2.34 m$^2$/g for an unwashed sample. The BET surface area was determined as follows:

BET surface area was measured using TriStar II 3020 apparatus (Micromeritics Instrument Corporation). A sample of 5.5866 g of (high surface area) sand from Qatar (washed, pre-sieved to below 2.36 mm particles size) was transferred to a 20 ml vial and dried in an oven at 125-150° C. for 2 days. The sample was transferred to the sample holder of the set-up and measurements were done using nitrogen adsorption at temperature of 77K. The relative pressure ($p/p_0$) was varied from 0.02 to 0.3 and in that interval 8 measurements points were collected for the adsorbed amount of nitrogen, obtaining in this way an isotherm plot. The data were processed according to the BET adsorption model using the set-up software. From the linear fit of the BET surface area plot, the BET specific surface area was calculated.

All ingredients were placed in a heated mantle at a temperature of 140° C. and mixed manually. Once the sulphur was molten and the mix was fully homogeneous (approximately 30 minutes), an organosilane additive (if used) was added using a syringe. The amount of organosilane was 0.2% by mass of the total composite. After further mixing (15 minutes), the final mix was placed into a pre-heated silicone mould of dimensions 4×4×16 cm$^3$ and tapped to ensure a smooth surface and to eliminate trapped air. Once cooled, the mortar prisms were removed from the moulds and broken into two pieces that were left for at least 3 days before being submerged under water. Water uptake was monitored by following the mass increase of the samples at regular intervals of time. The organosilane additives used are shown in Table 1.

TABLE 1

| | Organosilane |
|---|---|
| Comparative Example 1 | None |
| Example 1 | Dynasylan ™ 1146 (amino silane oligomer, see structure on page 5) |
| Example 2 | 3-aminopropyl triethoxysilane |
| Comparative Example 2 | Bis-triethoxysilyl propyltetrasulphide |
| Comparative Example 3 | Mercaptopropyl triethoxysilane |

BRIEF DESCRIPTION OF THE DRAWING

The water uptake is shown in FIG. 1. The x axis represents time in days; the y axis represents % increase in mass, based upon the original mass of the dry sulphur mortar. In the Examples of the invention (wherein an organosilane having an amino functional group is included in the sulphur mortar), the water uptake is significantly reduced when compared to the Comparative Examples (wherein no organosilane is included, or wherein polysulphide or mercapto organosilanes are included).

Further samples consisting of 25 wt % sulphur, 24 wt % quartz and 51 wt % washed Qatar sand (which was sieved to remove particles with diameter greater than 2 mm) were prepared using the following method. The surface area of this sand was greater than 2 m$^2$/g. All components were pre-heated and weighed into a mixing vessel; the organosilane was then added. The organosilane was diluted in ethanol at 10 wt %. The amount of organosilane used was between 0.1 and 0.3 wt %, based upon the mass of the total composite. However, in each case the mass was calculated in order to provide the same molar concentration of silicon. The contents of the vessel were heated to 140° C. and mixed for approximately 1 hour to give a homogeneous consistency. The mix was then placed into pre-heated 4×1×1 cm$^3$ silicone moulds. Once cooled, the prism samples were removed from the moulds. Prisms were submerged under water and mass increase was followed as a function of time. The organosilane used in each sample is recorded in Table 2, which also shows the increase in weight due to water uptake over a period of 4 weeks and the strength retention of the samples. The strength of both dry and wet samples were measured, using a 3-point bending test. The strength retention was calculated from the wet strength divided by the initial, dry strength. Some of the strength results appear to be greater than 100%. Strength retention of greater than 100% is unlikely in practice but these results are due to errors inherent in the measurement methods.

Examples 3 to 11 of the invention (wherein an organosilane having an amino functional group is included in the sulphur mortar) show lower water absorption and better strength retention than comparative example 4 (wherein an organosilane having a mercapto functional group is included in the sulphur mortar). Example 9 shows that an imine compound acts as an organosilane having an amine functional group under the processing conditions.

TABLE 2

| | Organosilane | Water Absorption | Strength Retention |
|---|---|---|---|
| Example 3 | (Cyclohexylaminomethyl)tri-ethoxysilane | 0.61 | 89.7 |
| Example 4 | Bis(triethoxysilylpropyl)amine | 0.44 | 104.1 |
| Example 5 | 3-aminopropylmethyldiethoxysilane | 0.43 | 111.6 |
| Example 6 | 3-aminopropyldimethylethoxysilane | 0.52 | 112.6 |
| Example 7 | Trimethoxysilylpropyldiethylene-triamine | 0.29 | 99.5 |
| Example 8 | 11-aminoundecyltriethoxysilane | 0.95 | 98.7 |
| Example 9 | N-{3-(triethoxysilyl)propyl}-4,5-dihydroimidazole | 0.38 | 102.4 |
| Example 10 | 1,3-bis(3-aminopropyl)-1,1,3,3-tetramethyldisiloxane | 0.59 | 97.3 |
| Example 11 | 3-aminopropyltrimethoxysilane | 0.39 | 99.8 |
| Comparative Example 4 | Mercaptopropyltriethoxysilane | 3.72 | 22.6 |

Mortar samples were prepared from 47% Qatar sand (sieved to remove particles with diameter >2.36 mm, and having a surface area greater than 2 m²/g), 27% quartz filler and 25% sulphur. All ingredients were placed in a heated mantle at a temperature of 140° C. and mixed manually. Once the sulphur was molten and the mix was fully homogeneous (approximately 30 minutes), the organosilane was added using a syringe. After further mixing (15 minutes), the final mix was placed into a pre-heated silicone mould of dimensions 4×4×16 cm³ and tapped to ensure a smooth surface and to eliminate trapped air. Once cooled, the mortar prisms were removed from the moulds and left for at least 3 days before being submerged under water. Water uptake was monitored by following the mass increase of the samples at regular intervals of time. After 106 days, the prisms were removed from the water and the flexural strength was measured. The results are shown in Table 3.

TABLE 3

| | Organosilane | Water uptake after 106 days submersion | Flex strength of sample after submersion in water, N/mm² |
|---|---|---|---|
| Example 12 | 0.2% 3-aminopropyl triethoxysilane | 0.09 | 12 |
| Example 13 | 0.3% 3-aminopropyl triethoxysilane | 0.14 | 13.5 |
| Comparative Example 5 | 0.3% Chloropropyl triethoxysilane | 1.46 | 2.9 |

Examples 12 and 13 (wherein an organosilane having an amino functional group is included in the sulphur mortar) show lower water uptake and better flexural strength than comparative example 5 (wherein an organosilane having a chloro functional group is included in the sulphur mortar).

What is claimed is:

1. A sulphur cement product comprising sulphur, filler, sand having a surface area of greater than 0.5 m²/g, and an organosilane having at least one amino functional group.

2. A sulphur cement product according to claim 1, wherein the amount of organosilane having at least one amino functional group in the sulphur cement product is from 0.05 to 2 wt %, based upon the weight of the sand having a surface area of greater than 0.5 m²/g.

3. A process for the preparation of a sulphur cement product comprising the steps of:
    (a) admixing sulphur, filler, sand having a surface area of greater than 0.5 m²/g, and an organosilane having at least one amino functional group; and
    (b) solidifying the molten sulphur cement product.

4. A process for the preparation of a sulphur cement product according to claim 3, wherein step (a) a sulphur cement pre-composition comprising sulphur and an organosilane having at least one amino functional group is mixed with filler and sand having a surface area of greater than 0.5 m²/g.

5. A process for the preparation of a sulphur cement product according to claim 4, wherein step (a) a wax-based pre-composition comprising wax and an organosilane having at least one amino functional group is mixed with sulphur, filler and sand having a surface area of greater than 0.5 m²/g.

6. A process for the preparation of a sulphur cement product according to claim 5, wherein step (a) the wax-based pre-composition additionally comprises a mineral adsorbate.

* * * * *